N. NICOLAI.
WAGON COVER.
APPLICATION FILED JUNE 23, 1911.
1,064,083.
Patented June 10, 1913.
3 SHEETS—SHEET 1.
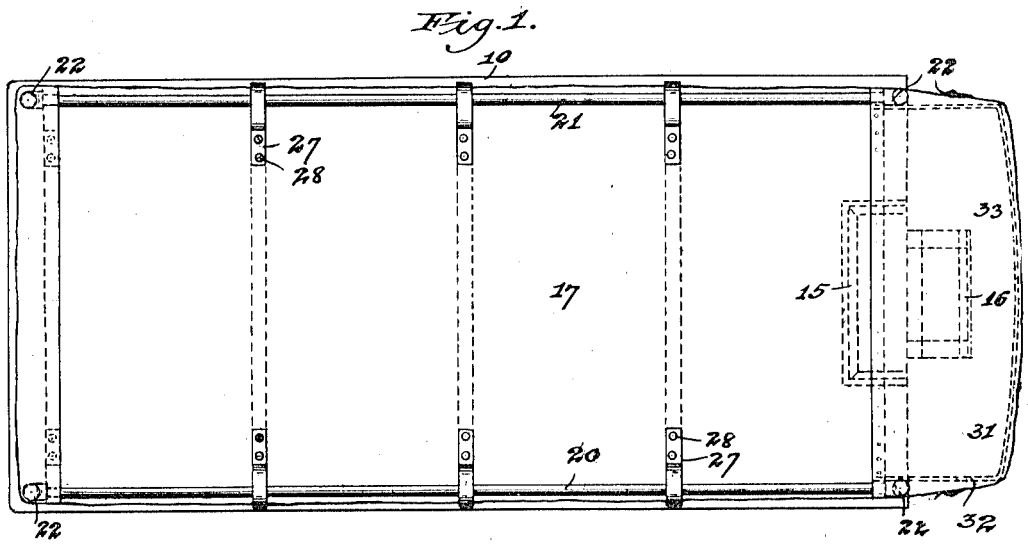
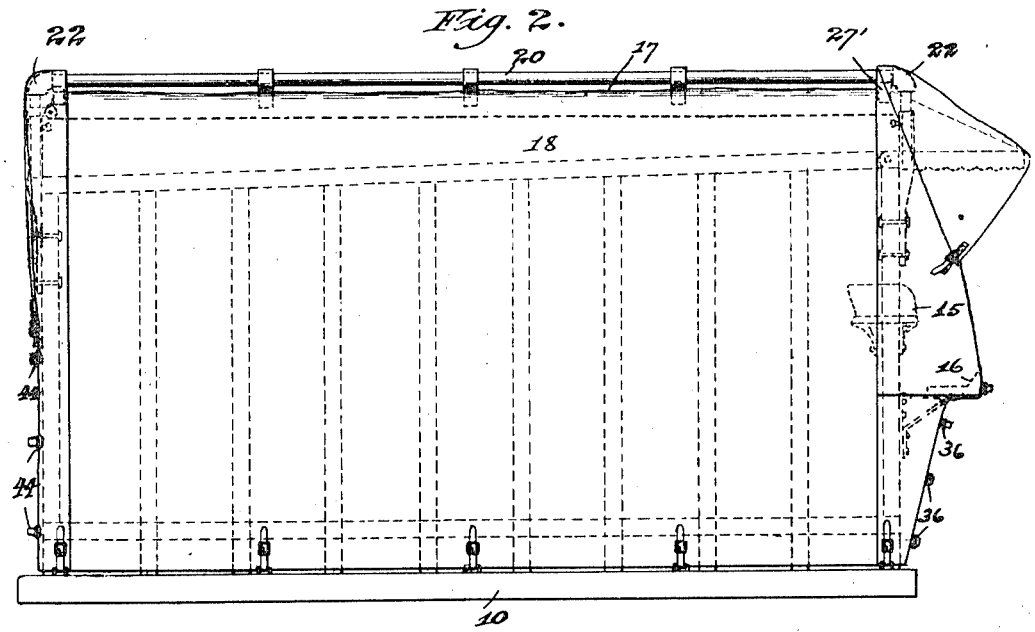

N. NICOLAI.
WAGON COVER.
APPLICATION FILED JUNE 23, 1911.
1,064,083.
Patented June 10, 1913.
3 SHEETS—SHEET 2.
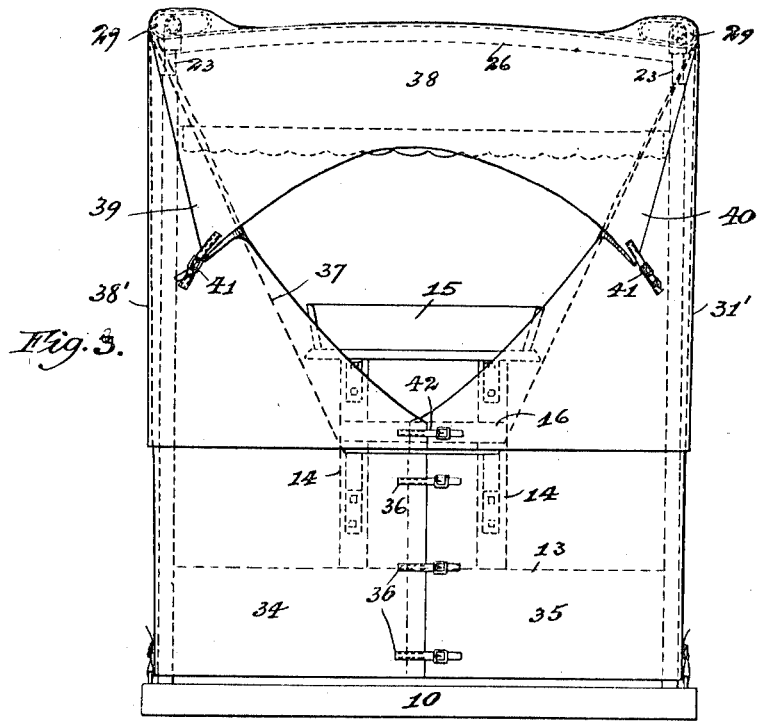
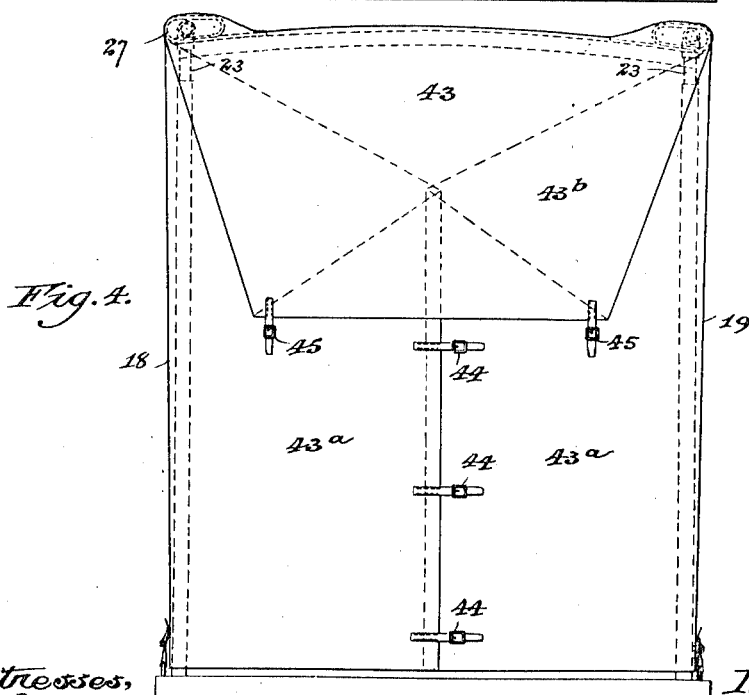

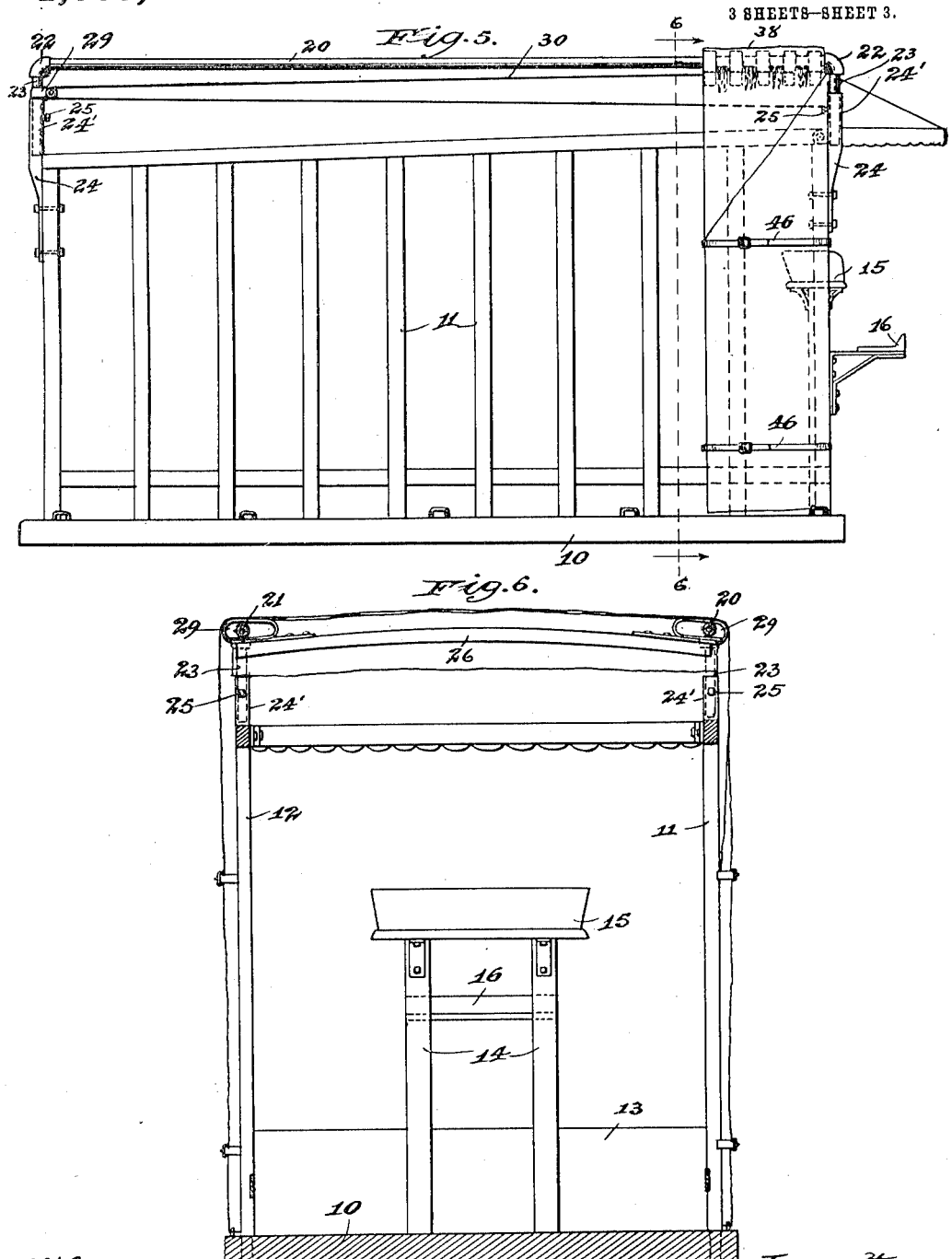

UNITED STATES PATENT OFFICE.

NICOLA NICOLAI, OF CHICAGO, ILLINOIS, ASSIGNOR TO JOSEPH H. NICOLAI, OF CHICAGO, ILLINOIS.

WAGON-COVER.

1,064,083.

Specification of Letters Patent. Patented June 10, 1913.

Application filed June 23, 1911. Serial No. 634,861.

*To all whom it may concern:*

Be it known that I, NICOLA NICOLAI, a citizen of the United States, residing at Chicago, in the county of Cook and State of Illinois, have invented certain new and useful Improvements in Wagon-Covers, of which the following is a clear, full, and precise specification.

My invention relates to improvements in wagon covers, and refers more particularly to improvements in folding wagon covers for use on moving vans, trucks and the like.

Among the salient objects of the invention are to provide a construction which can be readily unfolded quickly by the driver from the seat end of the vehicle and which can be readily folded up at the seat end into a small space; to provide a construction which will enable the front and rear ends of the wagon to be substantially completely inclosed and which at its front end has extensions or flaps which when open can be used to protect the driven against the weather and which can be closed over the folded up main part of the cover to rigidly hold the folded cover in place; and in general to provide an improved construction of the character referred to.

The invention will be clearly understood by reference to the accompanying drawings, in which—

Figure 1 is a plan view showing the cover in place on a wagon, Fig. 2 is a side elevational view of the wagon body and cover in open position thereon, Fig. 3 is an elevational view of the front of the wagon body showing the arrangement of the protecting extensions and flaps, Fig. 4 is a rear view of the wagon body showing the rear extensions of the cover folded to inclose the rear end of the wagon, Fig. 5 is a side elevational view of the wagon body showing the cover in folded-up position at the seat end, and Fig. 6 is a sectional view taken on plane 6—6, Fig. 5.

The wagon body may be of ordinary construction, and as shown, comprises a floor 10, the skeleton side frames 11 and 12, the dash board 13, uprights 14 from the dash board, and a seat 15 and foot-rest 16 supported from said uprights.

The main part of the wagon cover comprises the roof 17 and the curtain sides 18 and 19, and the roof and sides may be an integral structure of canvas or other suitable material. To support this cover part slide rods 20 and 21 are provided over the sides 11 and 12 respectively of the wagon body, the rods terminating in elbow fixtures 22 from which extend downwardly supporting studs or posts 23.

Secured to the front and rear ends of the wagon side frames are brackets 24 whose upper ends 24' are tubular for receiving the posts 23, this telescopic engagement allowing vertical adjustment of the slide rods, set screws 25 then serving to secure the rods in adjusted position.

Extending transversely between the slide rods and at the inside of the cover roof 17 are cross beams or bars 26 which are held in place to the roof by means of brackets 27 engaging the top of the roof 17 and secured to the cross bars by means of screws 28. The outer ends of these brackets have elongated loops 29 for receiving the slide rods, and thus the roof and curtain sides can be stretched to inclose the sides and top of the wagon body to be folded together upon sliding together of the brackets 27 on the slide rods. The front brackets 27' are preferably rigidly secured to the side rods so that the cover will be folded up at the front or seat end of the vehicle.

In order to facilitate the rapid unfolding or extending of the cover sheave or pulley, frames 29 are secured to the rear posts 23, and cords 30 pass about the wheels of the sheave frame, one end of the cords being secured to the ends of the rear cross bar 26 and the other ends of the cords being temporarily fastened to the front posts 23 or in any other intermediate place so that if the cover is folded up, as indicated in Fig. 5, the driver, without leaving his seat, can quickly manipulate the cords to draw the cover rearwardly to inclose the vehicle.

A canopy top 31 is also provided over the driver's seat, the bow frame 32 therefor being hinged to the front ends of the wagon side frames and the canvas covering 33 thereof being secured at its upper edge to the front cross bar 26.

In order to inclose the front end of the wagon and also to afford protection for the driver the sides 18 and 19 of the cover are extended a distance beyond the front ends of the wagon side frames to form flaps 34 and 35, to which are secured strap and buckle mechanism 36, by means of which their ends can be secured together, as best shown in Fig. 3. The upper inner corners of these flaps may be cut away, as indicated at 37, so as to clear the canopy top. To still further inclose the front end of the vehicle and to offer additional protection to the driver and also to form a protecting cover for the folded body part of the cover, a rectangular piece 38 is secured at its inner edge to the top of front cross bar 26. When the vehicle is to be closed the sides of this piece 38 may be given intermediate folds 39 and 40, as shown in Fig. 3, to bring the sides 38' snugly against the wagon structure and the ends thereof together at the front of the driver's foot-rest, thus to effectively protect the driver from the front and sides. Buckle and strap mechanism 41 may be provided to hold the folds 39 and 40 in place, and strap and buckle mechanism 42 may be provided for holding together the ends of the piece 38 at the driver's foot-board.

In Fig. 4 the arrangement is shown for protecting the rear end of the wagon. For this purpose a rectangular extension 43 is secured to the roof and sides 17, 18 and 19 of the cover, the side sections 43$^a$ of this extension being swung inwardly across the rear end of the vehicle and their edges overlapped and fastened by strap and buckle mechanism 44. The top section 43$^b$ is then swung downwardly against the sections 43$^a$ and secured to these sections by means of buckle and strap mechanisms 45. The flap extension part 43 engages over the rear brackets 27 so that this extension will pass over the slide bars as the roof and sides of the cover are folded together. If it is now desired to fold up the cover the various strap and buckle mechanisms are first undone and then the bracket frames brought together at the front end of the vehicle and the roof and sides of the cover thus folded together. The extension part 38 is then folded over the roof and side parts, whereafter the front piece or flap 38 is swung rearwardly over the part 38 and the front side extensions 34 and 35 then swung rearwardly, as indicated in Fig. 5. When the parts are thus folded and laid together straps 46 may be looped about them and parts of the wagon body to securely hold these folded parts snugly together to prevent unfolding thereof and interference thereof with the use of the wagon.

I thus provide a cover for wagons which can be folded together into a small space at the driver's end of the wagon and which can be readily unfolded to close the wagon by means of mechanism controllable by the driver from his seat and whose extensions can be quickly brought together to efficiently seal the front and rear ends of the vehicle and to amply protect the driver against the weather. The top can be readily applied to or entirely disconnected from the wagon, the folding cover parts are all carried by the slide brackets and slide rods, and these rods can be quickly applied to or detached from the vehicle by means of the telescopic engagement of the posts 23 with the brackets 24.

I do not of course desire to be limited to the precise construction, arrangement and control shown and described, as changes are of course possible which would still come within the scope of the invention, and I therefore claim the following:

1. In a vehicle, the combination with the vehicle sides and a seat and foot-rest at the front end thereof, of slide rods mounted along the tops at the opposite sides of the vehicle, cross bars having elongated loops at their ends for receiving said slide rods, a main cover supported on said cross rods to extend over the top and along the sides of the vehicle, forward extensions from the front ends of the sides of the main cover and adapted to be brought forwardly in front of the seat and foot-rest and to be there secured, a canopy secured to the front end of the vehicle over the seat, an extension from the front end of the top part of the main cover adapted to be secured over the canopy and to extend in front of said seat to partially surround said seat, and securing means fastened at intermediate points of said canopy covering extension for holding intermediate folds of said extension to cause said extension to more securely fit about said canopy and seat.

2. In a vehicle, the combination with the vehicle sides and a seat and foot rest between the front ends thereof, of slide rods mounted along the top of the opposite sides of the vehicle, cross bars slidable on said slide rods, a main cover supported on said cross rods over the top of the vehicle and along the sides thereof to the vehicle floor, the front ends of the sides of said cover extending a distance beyond the vehicle side ends and secured together across the front of the vehicle, the upper edges of said extensions being cut away to expose the seat, a canopy secured to the front end of the vehicle over the seat, a supplemental cover secured to the vehicle front end over the canopy to extend in front of the seat to partially surround the latter, and means for holding the ends of said supplemental cover together in front of said seat.

In witness whereof, I hereunto subscribe my name this 4th day of June, A. D., 1911.

NICOLA NICOLAI.

Witnesses:
F. L. BELKNAP,
Jos. H. NICOLAI.